(12) United States Patent
Okuyama et al.

(10) Patent No.: US 7,874,785 B2
(45) Date of Patent: Jan. 25, 2011

(54) WORKPIECE CONVEYING APPARATUS OF MACHINE TOOL

(75) Inventors: Yoshinobu Okuyama, Yamatokoriyama (JP); Takashi Kominami, Yamatokoriyama (JP); Shinichi Maejima, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 300 days.

(21) Appl. No.: 11/819,693

(22) Filed: Jun. 28, 2007

(65) Prior Publication Data
US 2008/0008567 A1    Jan. 10, 2008

(30) Foreign Application Priority Data
Jul. 7, 2006    (JP)    ............................. 2006-188425

(51) Int. Cl.
*B65G 65/00*    (2006.01)

(52) U.S. Cl. ...................... 414/749.1; 100/207; 901/21; 74/490.04

(58) Field of Classification Search .............. 414/749.1, 414/752.1, 751.1, 753.1; 901/16, 21; 104/146; 100/207; 72/405.06; 277/550, 906; 74/490.04
See application file for complete search history.

(56) References Cited

U.S. PATENT DOCUMENTS

| 4,567,817 A | * | 2/1986 | Fleischer et al. | ............ 454/166 |
| 7,476,072 B2 | * | 1/2009 | Tamura | .................... 414/749.1 |

FOREIGN PATENT DOCUMENTS

JP    2003-117760 A    4/2003

* cited by examiner

*Primary Examiner*—Donald Underwood
(74) *Attorney, Agent, or Firm*—Smith Patent Office (57) ABSTRACT

A workpiece conveying apparatus of a machine tool, capable of covering a workpiece moving mechanism based on a simple structure and thereby preventing the entire machine from increasing in size is provided. A frame member 8 is formed by a pipe body extending from a workpiece machining position A to the vicinity of a workpiece carry-in-and-out position B, and the workpiece moving mechanism 7 is structured that a belt 12 is wound around a driving pulley 10 and a driven pulley 11 to drive the driving pulley 10 to rotate by a driving motor 13 where the belt 12 is arranged in the accommodated state in the frame member 8.

3 Claims, 9 Drawing Sheets

WORKPIECE CONVEYING APPARATUS OF MACHINE TOOL

BACKGROUND OF THE INVENTION

1. Field of the Invention

The present invention relates to a workpiece conveying apparatus of a machine tool intended to convey a workpiece (including a material before machining) between a workpiece machining position and a workpiece carry-in-and-out position.

2. Description of the Related Art

In a machine tool, for example, a lathe, there is sometimes a case where a workpiece conveying apparatus is provided. The apparatus automatically performs a work such as of receiving a processed workpiece from a chuck of a main spindle at a machine machining position to thereby carry it out to a workpiece stocker provided at a carry-in-and-out position or receiving an unprocessed material from the workpiece stocker to fit it to the chuck.

As a workpiece conveying apparatus of this type, there is one structured to cover a frame member, a workpiece moving mechanism, and a support member supporting a workpiece gripping mechanism by a cover member, in which a slit groove passing through the support member outward is formed in the cover member (for example, see Patent document 1). [Patent document 1] Japanese Patent Application Laid-Open No. 2003-117760.

In the case of the workpiece conveying apparatus described in Patent document 1, the structure covering the frame member, the workpiece moving mechanism, and the support member by the cover member is adopted, in which the cover member is forced to have a large size to cover the entire length of the frame member together with the workpiece moving mechanism and the support member, causing problems that the entire apparatus is increased in size to the extent thereof and that cost is increased as well.

SUMMARY OF THE INVENTION

The present invention has been made in consideration of the above-described conventional problems, and an object thereof is to provide a workpiece conveying apparatus capable of covering a workpiece moving mechanism based on a simple structure and preventing the entire apparatus from increasing in size.

In an invention, a workpiece conveying apparatus of a machine tool composed of: a workpiece gripping mechanism gripping a workpiece; a workpiece moving mechanism moving the workpiece gripping mechanism between a workpiece machining position and a workpiece carry-in-and-out position; and a frame member supporting said workpiece moving mechanism in a movable manner, in which the frame member is composed of a pipe body extending at least to a vicinity of the workpiece carry-in-and-out position from the workpiece machining position, in which the workpiece moving mechanism is structured to wind a belt member around a driving member and a driven member and to drive the driving member to rotate by a driving motor, and in which the belt member is arranged in an accommodated state in the frame member.

Here, in the present invention, the pipe body composing the frame member does not necessary form a completely closed section when viewed in transverse section, and includes, for example, those with a required machining such as a slit groove to insert the support member therethrough as will be described later.

Further, the workpiece moving mechanism according to the present invention is not limited to that of a belt system winding a belt around a driving pulley and a driven pulley, and also includes that of a chain type winding a chain around a driving sprocket and a driven sprocket.

Furthermore, in the present invention, "the belt member is arranged in the accommodated state in the frame member" includes when most part of the belt member is arranged in the frame member, in which entire the driving member and the driven member are not necessarily arranged in the frame member.

In the invention, the belt member is arranged in the accommodated state in the pipe body extending at least to the vicinity of the workpiece carry-in-and-out position from the workpiece machining position, in which the frame member serves as a cover of the workpiece moving mechanism as well as a frame body supporting the workpiece moving mechanism, eliminating the need of a cover member described in Patent document 1, so that the entire machine can be made compact and the cost reduction can be realized as well.

In a preferable embodiment of the invention, the workpiece moving mechanism includes a support member connected to the belt member, the support member is supported by the frame member in a freely movable manner between the workpiece machining position and the workpiece carry-in-and-out position, and the workpiece gripping mechanism is mounted onto the support member.

In the above-described embodiment, the workpiece moving mechanism includes the support member connected to the belt, and the workpiece gripping mechanism is mounted to the support member, so that the workpiece gripping mechanism arranged outside the frame member can be moved by the belt member while the belt member is arranged in the frame member.

In another preferable embodiment of the invention, the support member includes a secured portion arranged in the frame member and secured at the belt member, a support portion arranged outside the frame member and supporting the workpiece gripping mechanism, and a connecting portion arranged to be inserted into a slit groove formed in the frame member and connecting the support portion and the secured portion.

In the above-described embodiment, the support member includes the secured portion arranged in the frame member, the support portion arranged outside the frame member, and the connecting portion connecting the support portion and the secured portion by passing through the slit groove of the frame member, so that a more concrete structure to move the workpiece gripping mechanism arranged outside the frame member by the belt member arranged in the frame member can be provided.

In still another preferable embodiment of the invention, a sealing mechanism sealing a space between the connecting portion and the slit groove is further included, in which the sealing mechanism is mounted onto the frame member and composed of a pair of leaf springs of a belt shape arranged to sandwich the connecting portion in a mutually slidable manner.

In the above-described embodiment, the pair of leaf springs of the belt shape is arranged to sandwich the connecting portion in a mutually slidable manner, so that the space between the connecting portion and the slit groove can be sealed surely based on the simple structure.

In still another preferable embodiment of the invention, a cableveyor formed by a flexible tube member and supplying working fluid or electric power to the workpiece gripping mechanism is arranged in an accommodated state in the frame member, and in which one end portion of the cableveyor is connected to the workpiece gripping mechanism to move together with said workpiece gripping mechanism and other end is connected and fixed to an external connection port formed in the frame member.

In the above-described embodiment, the cableveyor supplying the work fluid or the electric power to the workpiece gripping mechanism and formed by the flexible tube member is arranged in an accommodated manner in the frame member, in which the one end portion of the cableveyor is connected to the workpiece gripping mechanism to move together therewith, and the other end portion is connected and fixed to the external connecting port of the frame member, allowing the cableveyor to be arranged using internal space of the frame member, so that workpiece gripping mechanism moving from the workpiece machining position to the workpiece carry-in-and-out position can be supplied with the work fluid or the electric power with no problem.

DETAILED DESCRIPTION OF THE PREFERRED EMBODIMENT(S)

Hereinafter, embodiments according to the present invention will be described with reference to the attached drawings.

FIG. 1 to FIG. 9 are views to illustrate a workpiece conveying apparatus of a machine tool according to a first embodiment of the present invention. Note that, in the present embodiment, front, rear, right and left mean the front, the rear, the right and the left of the state when viewed from a front C of the machine (the state shown in FIG. 1).

Figure 1:
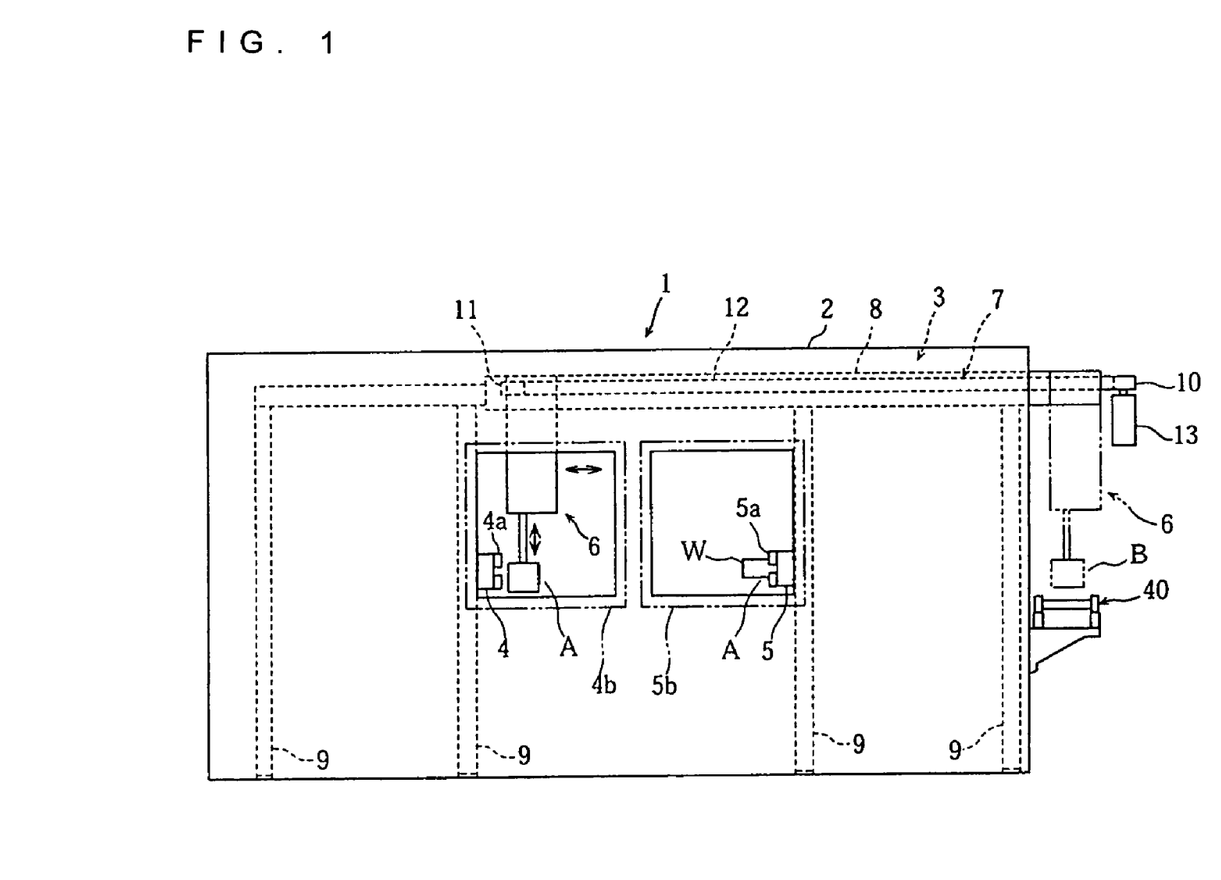
FIG. 1 is a schematic front view of a lathe including a workpiece conveying apparatus according to an embodiment of the present invention.
Figure 2:
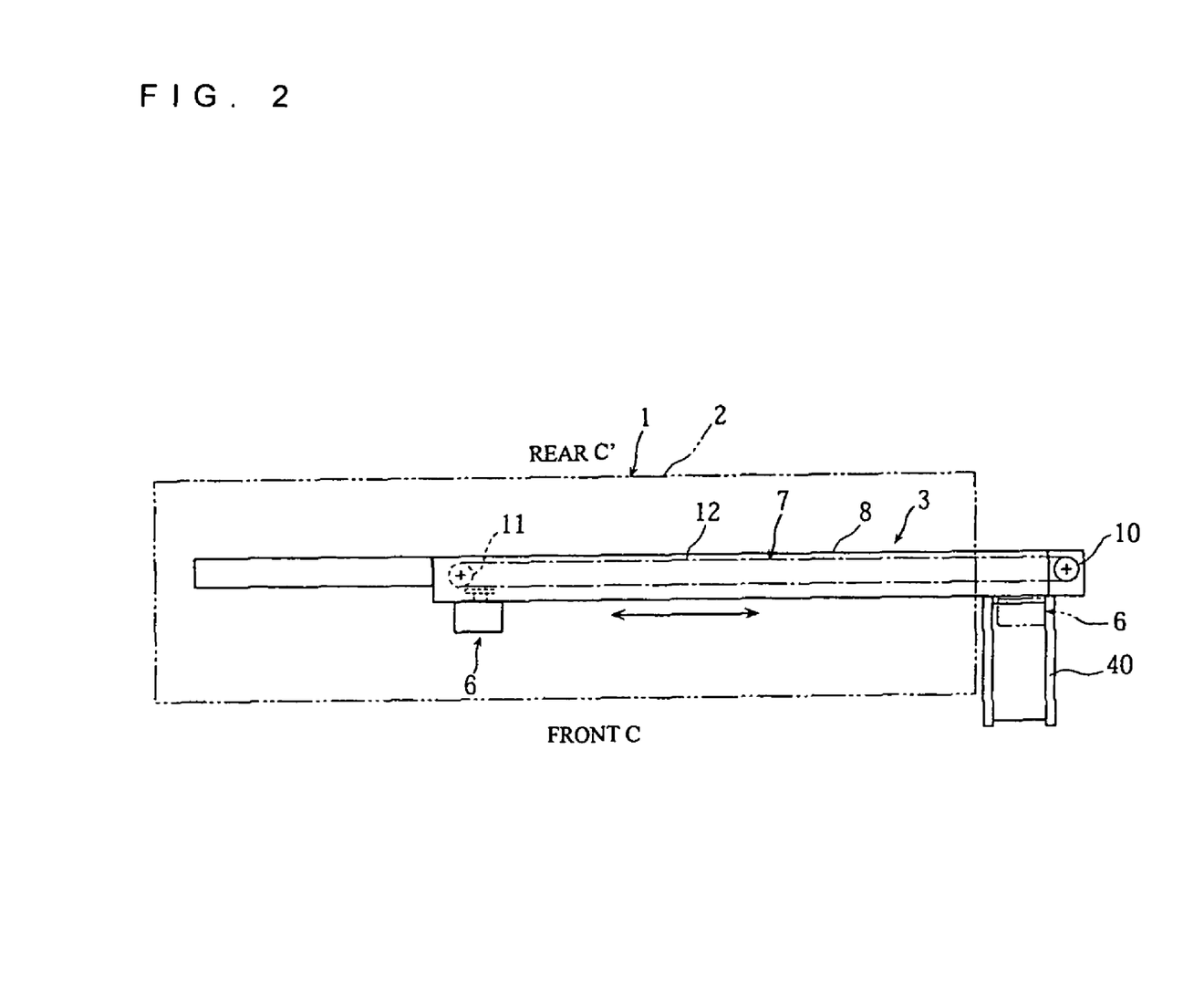
FIG. 2 is a schematic plan view of the lathe.
Figure 3:
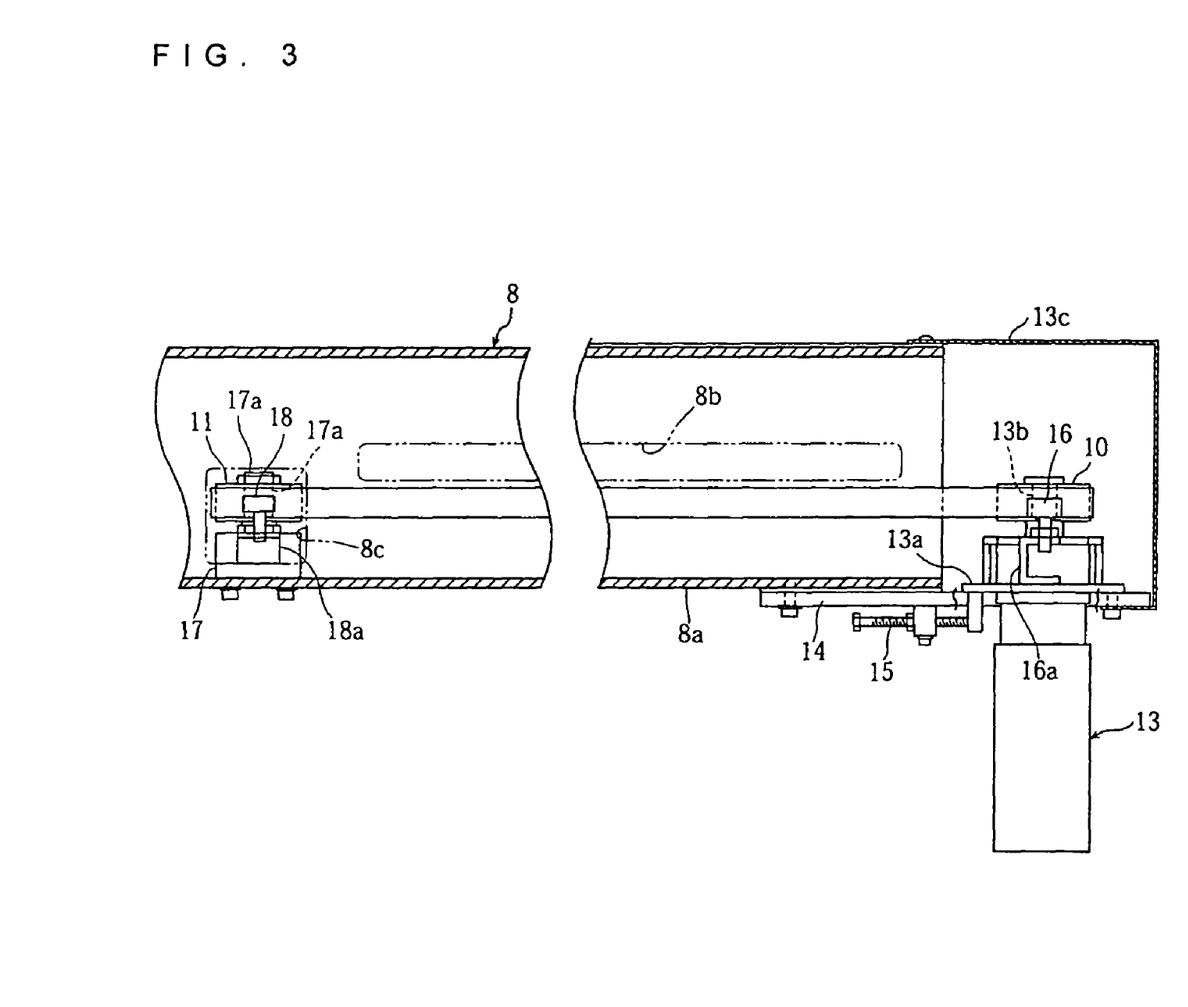
FIG. 3 is a sectional front view of a workpiece moving mechanism portion of the workpiece conveying apparatus.
Figure 4:
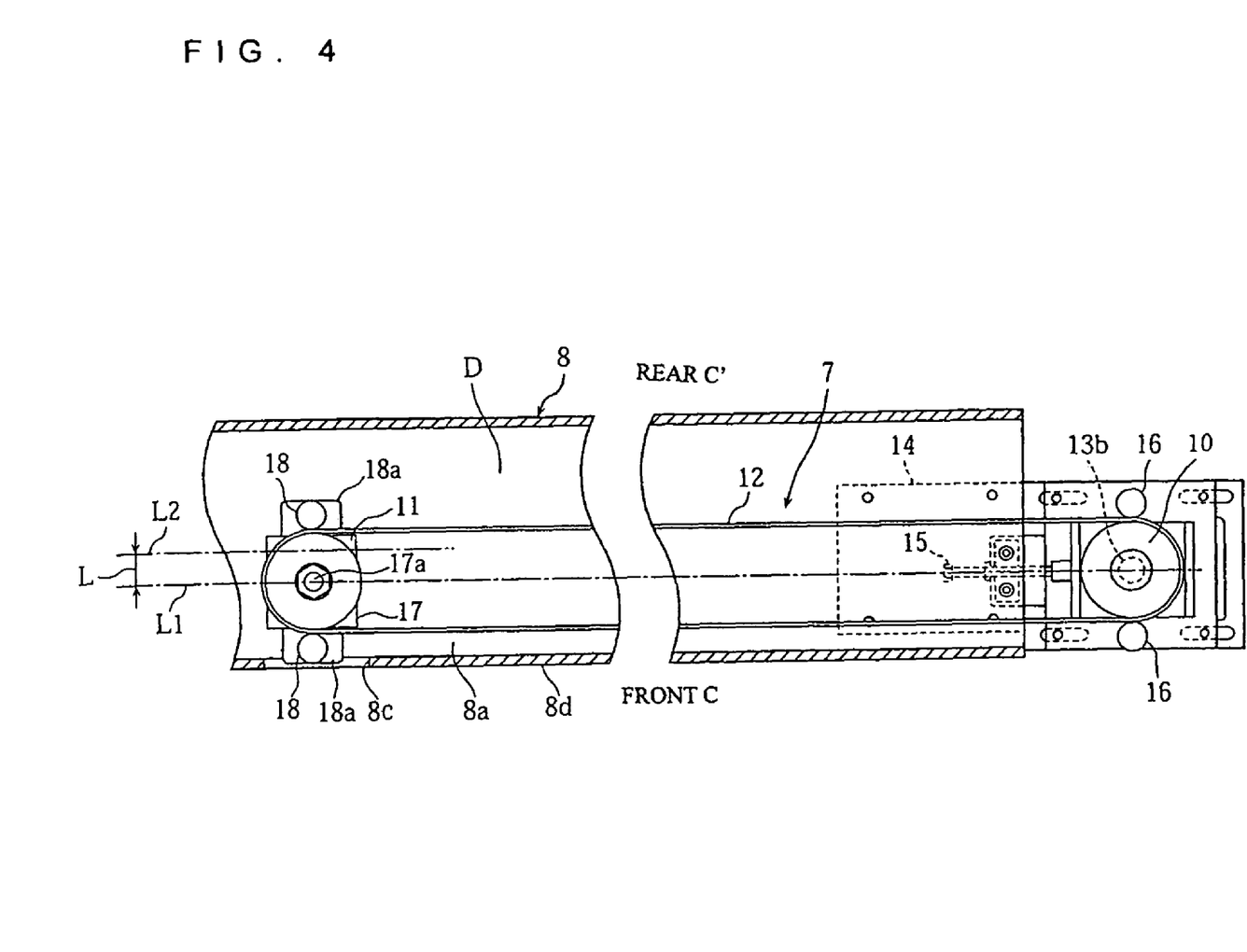
FIG. 4 is a sectional plan view of the workpiece moving mechanism.
Figure 5:
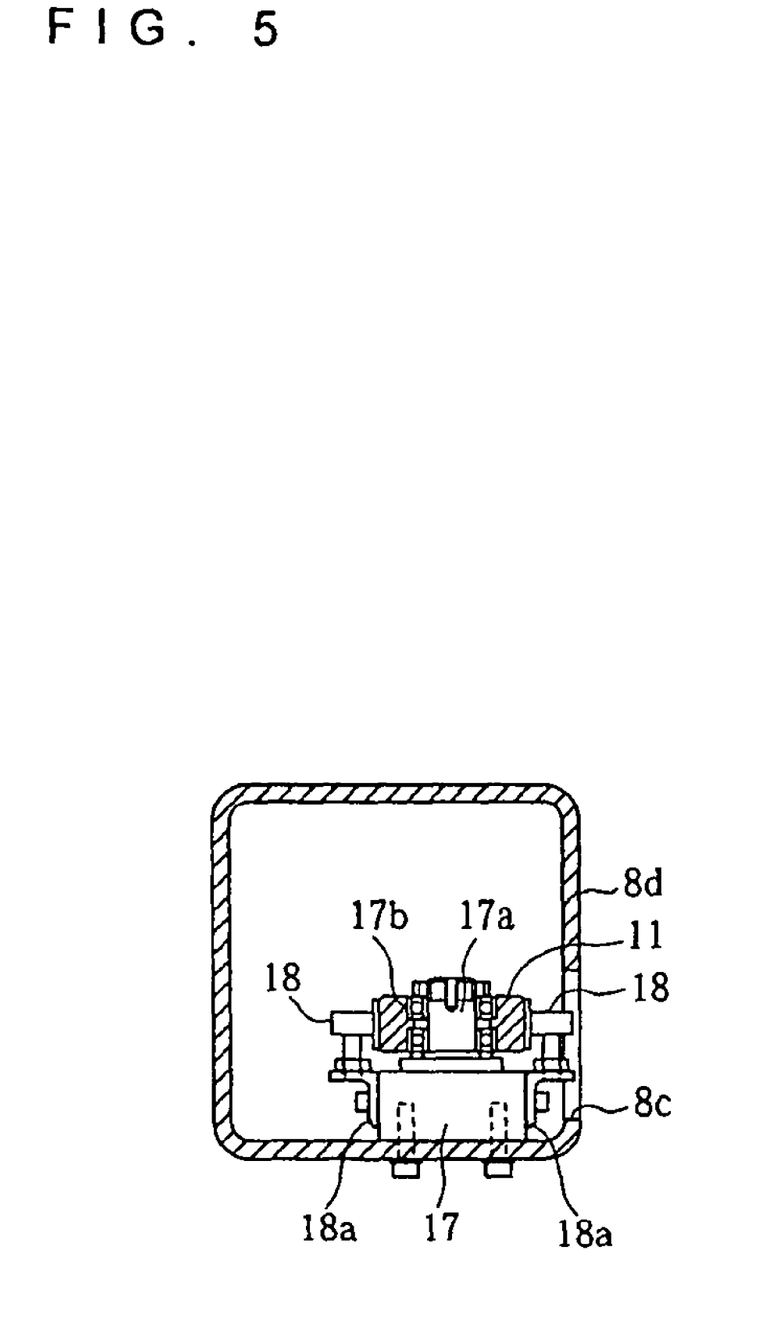
FIG. 5 is a sectional side view of the workpiece moving mechanism.
Figure 6:
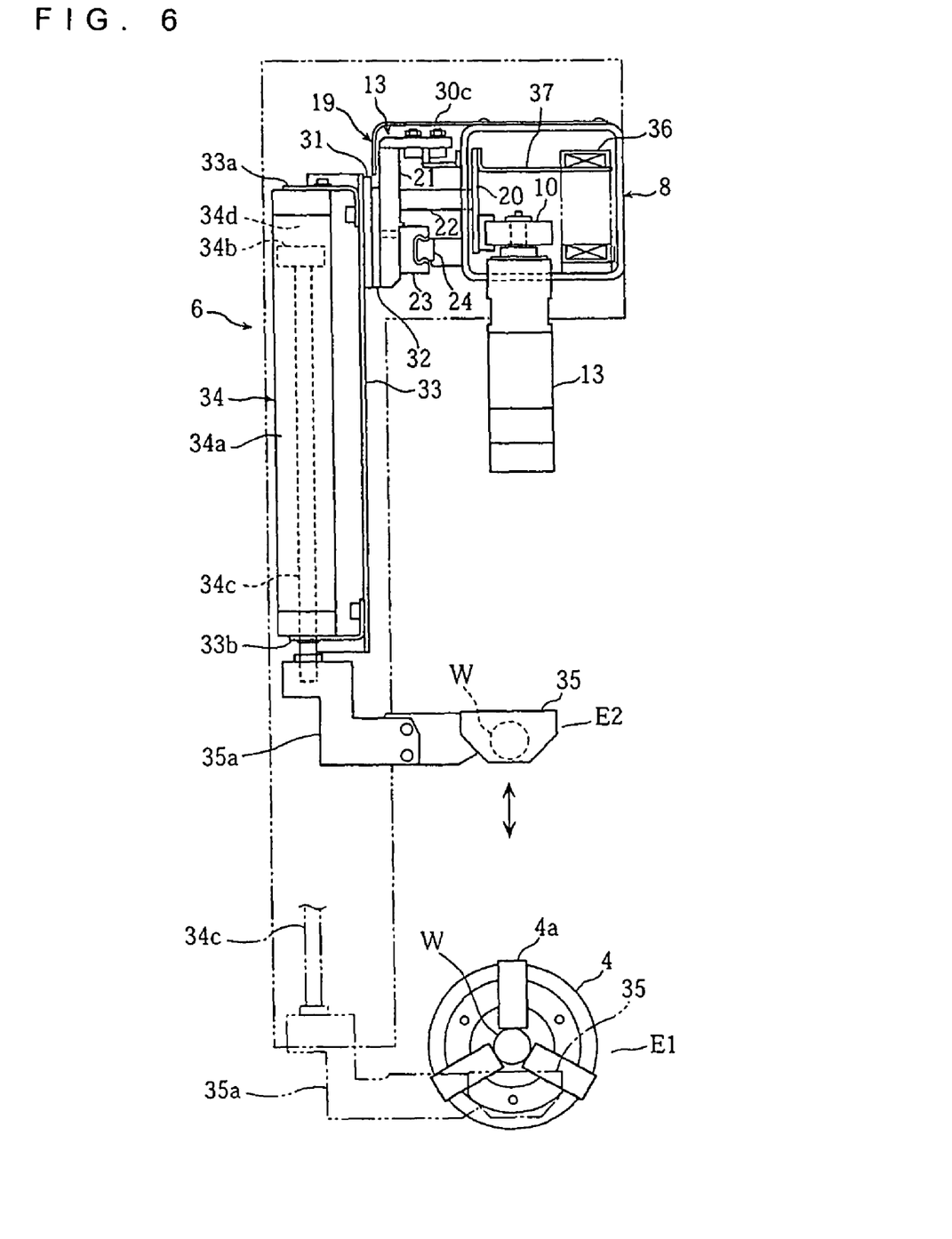
FIG. 6 is a side view of a workpiece gripping mechanism portion of the workpiece conveying apparatus.
Figure 7:
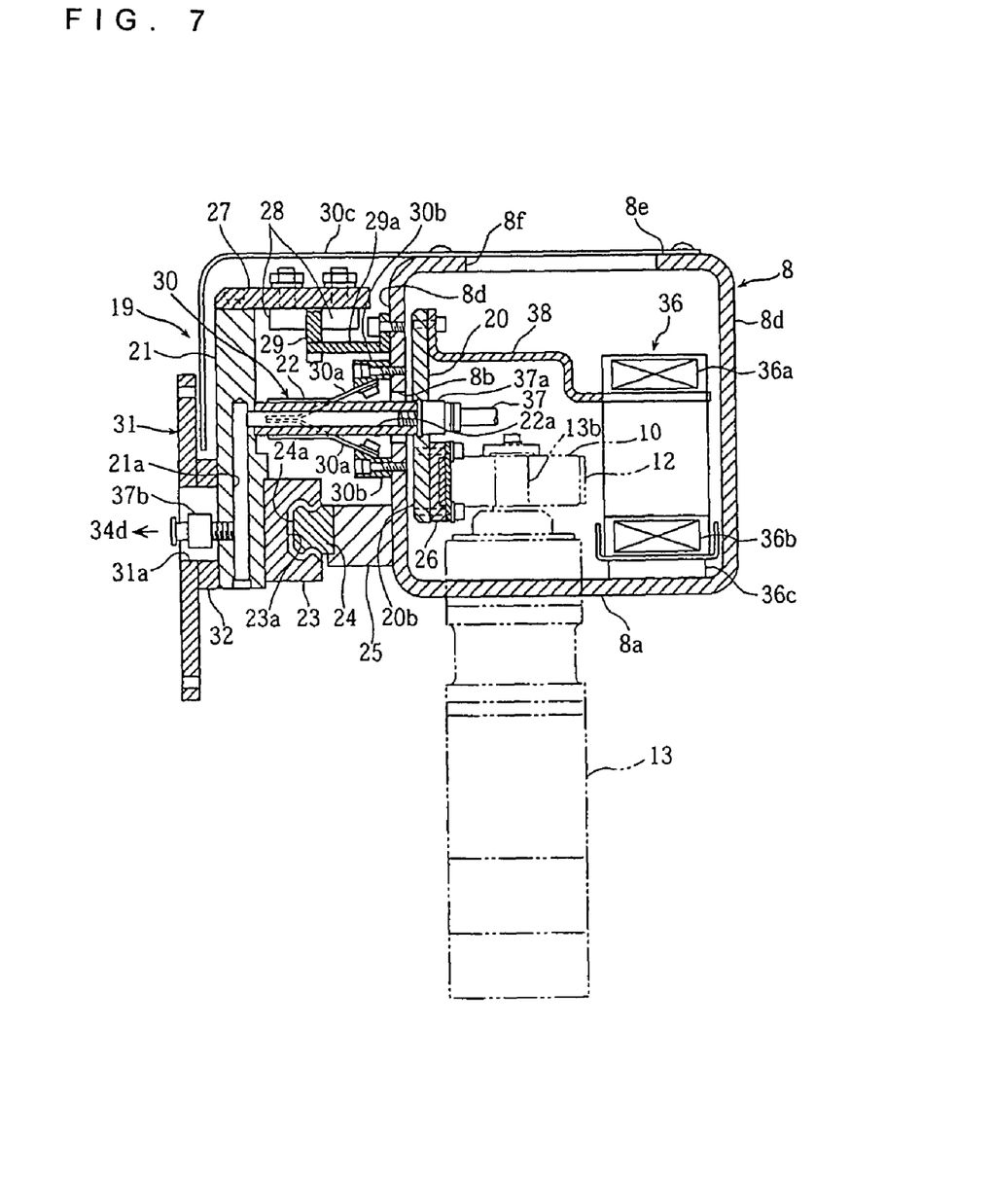
FIG. 7 is a sectional side view of the workpiece moving mechanism.
Figure 8:
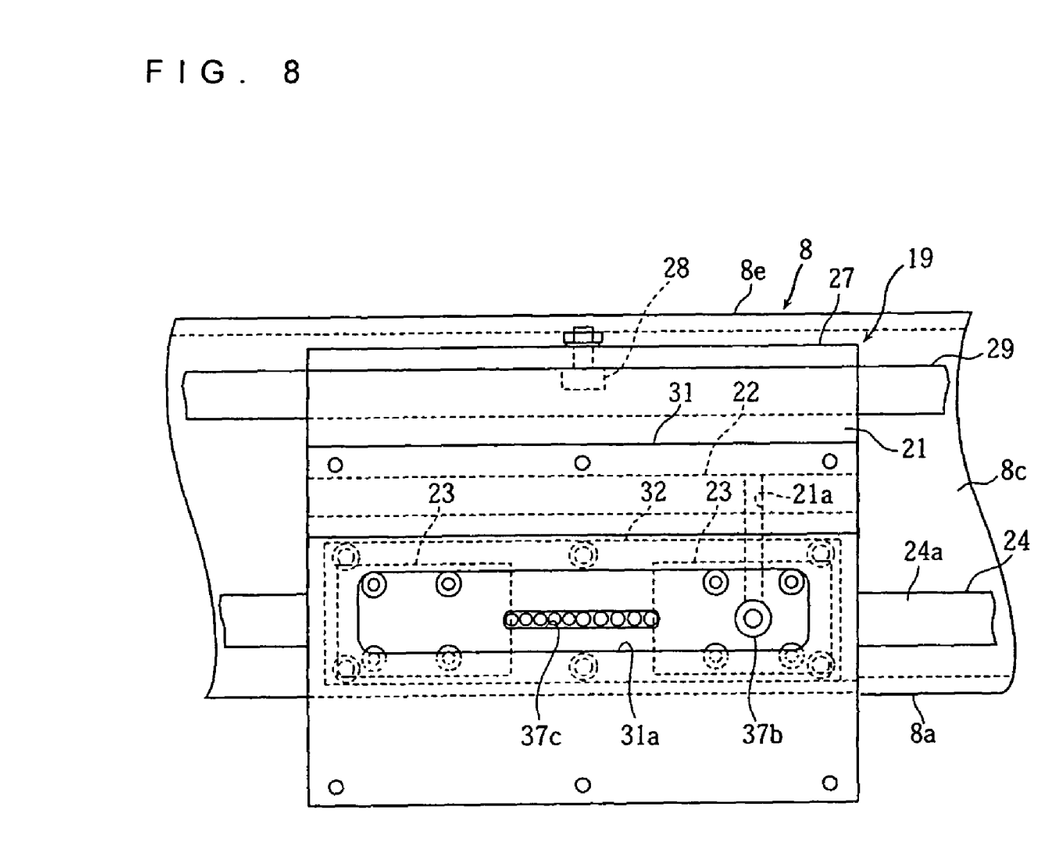
FIG. 8 is a front view of a support member portion of the workpiece conveying mechanism.
Figure 9:
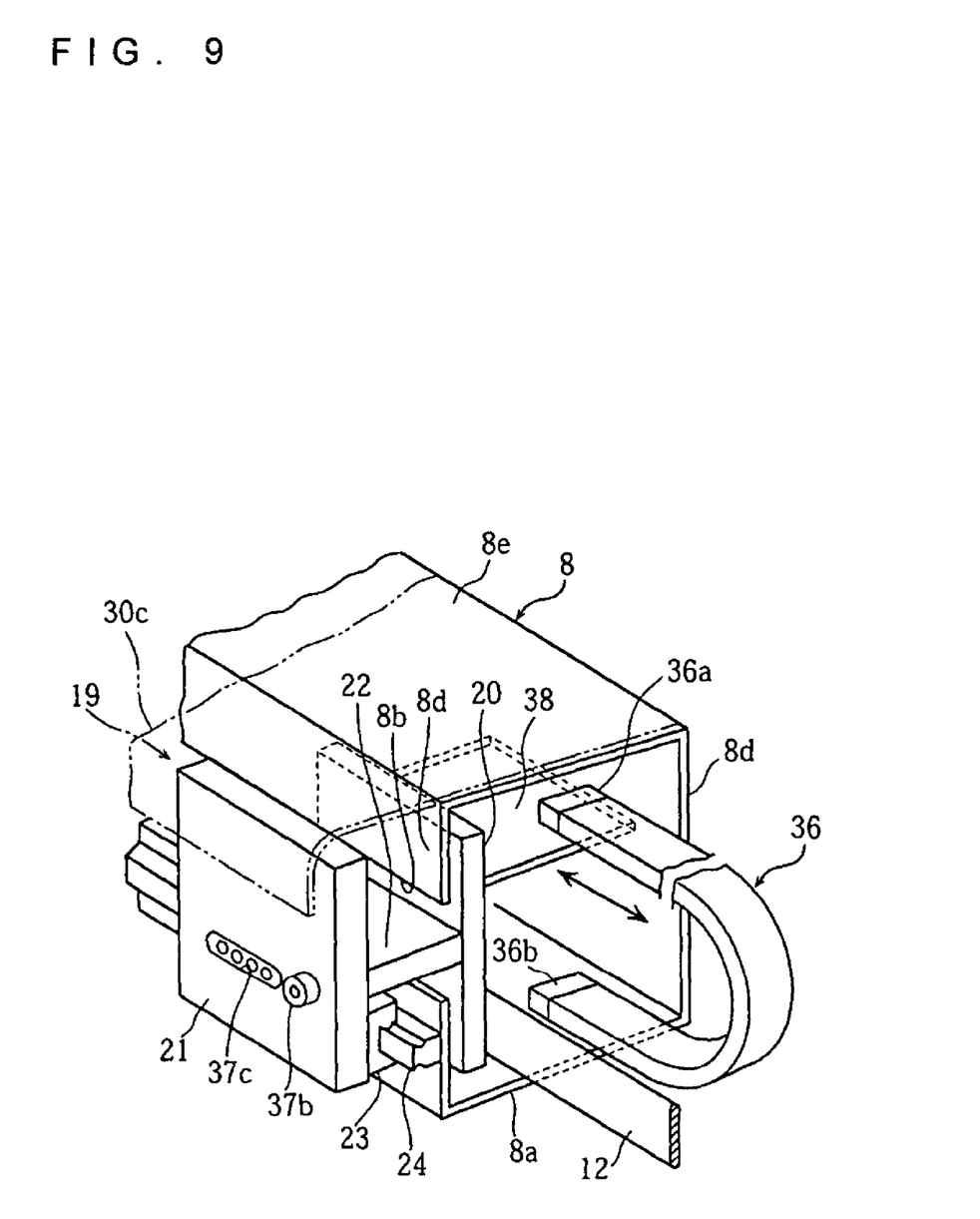
FIG. 9 is a schematic perspective view of the workpiece moving mechanism portion.

In these drawings, a numerical reference "1" denotes a lathe (machine tool) entirely covered by a machine body cover 2 and including, in the machine body cover 2, a workpiece conveying apparatus 3 of an inside machine running type. The lathe 1 includes a first spindle headstock 4 and a second spindle headstock 5 that are arranged at a workpiece machining position A inside the machine body cover 2, in which the respective spindle headstock 4, 5 are provided with chucks 4a, 5a, gripping a workpiece W, respectively. Note that "4b", "5b" are doors of the machine body cover 2 to open/close the workpiece machining positions A, A.

The workpiece conveying apparatus 3 includes a workpiece gripping mechanism 6 gripping a workpiece, a workpiece moving mechanism 7 moving the workpiece gripping mechanism between the workpiece machining position A and a workpiece carry-in-and-out position B, and a frame member 8 supporting the workpiece moving mechanism 7.

The frame member 8 extends in a right-and-left direction from above the workpiece machining position A to above the workpiece carry-in-and-out position B and is composed of a square pipe (pipe body) having a square traverse section with its plural portions being supported and secured by columns 9.

The workpiece moving mechanism 7 is structured that a driving pulley (driving member) 10 having a belt latching gear formed on its outer peripheral and a driven pulley (driven member) 11 having a belt latching gear formed on its outer peripheral similarly are wound by a belt (belt member) 12 having a latching gear, and that the driving pulley 10 is driven to rotate by a driving motor 13.

The driving pulley 10 is secured to an output shaft 13b of the driving motor 13. The driving motor 13 is arranged at a position slightly distant from the right end portion of the frame member 8 outward in the shaft direction of the frame member in a manner that the position thereof is adjustable in the shaft direction. A flange plate 13a attached to the driving motor 13 is mounted onto a support plate 14, thereby when an adjusting bolt 15 is fasten, the adjusting bolt 15 moves the flange plate 13a and further the driving motor 13 rightward in the drawing, so that the tension of the belt 12 is adjustable. Note that the support plate 14 is secured onto the bottom face of a bottom wall 8a of the frame member 8. Further, the numerical reference "13c" denotes a cover formed in an extending manner from the frame member 8 to cover the circumference of the driving pulley 10.

Further, a pair of cam followers 16, 16 is arranged to contact in a rolling manner to the belt 12 wound around the driving pulley 10 with their axis lines being in parallel with the axis of the pulley. The cam followers 16, 16 are secured to a bracket 16a by bolting, and the bracket 16a is secured to the flange plate 13a.

The driven pulley 11 is supported by a shaft portion 17a of a base member 17 via a bearing 17b in a freely rotatable manner. The base member 17 is secured onto the upper surface of the bottom wall 8a of the frame member 8 by bolting. Further, a pair of cam followers 18, 18 having the same structure as of the driving pulley 10 side is arranged on the outer circumference of the driven pulley 11. The cam followers 18, 18 are secured to a bracket 18a by bolting, and the bracket 18a is secured to the base member 17. Note that "8c" denotes an opening formed in a side wall 8d of the frame member 8, and that the above-described driven pulley 11 portion can be maintained easily using this opening 8c.

In this manner, the portion of the belt 12 except the above-described driving pulley 10 portion is arranged in an accommodated manner in the frame member 8. Further, when viewed from above (see FIG. 4), the workpiece moving mechanism 7 is arranged in the frame member 8 in a manner that a center line L1 of the driving and driven pulleys 10, 11 deviates toward a front face C side by "L" in comparison with a center line L2 of the frame member 8. With this, in the frame member 8, a vacant space D is formed on a rear surface C' side, and thereby a later-described cableveyor 36 is arranged in the space D.

Further, the workpiece moving mechanism 7 includes a support member 19 connected to the belt 12. The support member 19 is supported between the workpiece machining position A and the workpiece carry-in-and-out position B in a freely movable manner by the frame member 8. The workpiece gripping mechanism 6 is attached to the support member 19.

More specifically, the support member 19 includes: a secured plate 20 arranged in the frame member 8 in parallel with the side wall 8d thereof and secured to the belt 12; a support plate 21 arranged outside the frame member 8 in parallel with the side wall 8d thereof to support the workpiece gripping mechanism 6; and a connecting plate 22 arranged horizontally to be inserted through a slit groove 8b formed in the frame member 8 and connecting the support plate 21 and the secured plate 20.

The secured plate 20 is of a rectangular plate shape with a lower portion 20b thereof being secured to a mid-course of the belt 12 by bolting via a jointing metal fitting 26. When the motor 13 of the workpiece moving mechanism 7 rotates, the secured plate 20 thereby moves together with the belt 12.

The support plate 21 is of a rectangular plate shape and a linear guide 23 is secured to the rear surface of the support plate 21. The linear guide 23 is of a rectangular solid shape and supported in a freely slidable manner by a sliding surface 24a of a guide rail 24 with its sliding groove 23a formed as a recession in the rear surface thereof. Note that a lot of balls are arranged in the sliding groove 23a of the linear guide 23. Further, the guide rail 24 is shaped into a bar body extending in the axial direction of the frame member 8 and mounted onto the outer surface of the side wall 8d of the frame member 8 via a base member 25.

Further, a cam bracket 27 of a plate shape extending toward the frame member 8 side is secured onto the upper edge of the support plate 21. The cam bracket 27 is provided with a pair of cam followers 28, 28 sandwiching a guide plate 29 therebetween. The guide plate 29 is of a band shape extending in parallel with the previously-described guide rail 24, and secured to the outer surface of the side wall 8d of the frame member 8 via a leg portion 29a.

The previously-described connecting plate 22 is of a rectangular plate shape and inserted through the slit groove 8b formed in the side wall 8d of the frame member 8. The vertical size of the slit groove 8b is set to be able to prevent from interfering with the connecting plate 22 and the horizontal size thereof is set to correspond to the distance between the workpiece machining position A and the workpiece carry-in-and-out position B.

Further, the space between the connecting plate 22 and the slit groove 8b is sealed by a sealing mechanism 30. The sealing mechanism 30 is structured that a pair of upper and lower leaf springs 30a, 30a each having a band shape is mounted onto the outer surface of the side wall 8d of the frame member 8 via brackets 30b, 30b. The leaf springs 30a, 30a are arranged so as to form an isosceles triangle with the side wall 8d when viewed in cross-section to sandwich the plate surface with their front portions, then the connecting plate 22 moves in the axial direction of the frame member 8 while pushing open the leaf springs 30a, 30a. Note that "30c" denotes a cover covering a portion above the sealing mechanism 30, the cam followers 28 and so on from the workpiece machining position A to the workpiece carry-in-and-out position B, and is mounted in a manner that a maintenance opening 8f formed in a top wall portion 8e of the frame member 8 is opennable/closable.

A support bracket 31 is secured via a spacer member 32 onto the front side of the support plate 21. The workpiece gripping mechanism 6 is secured to the support bracket 31 by bolting.

The workpiece gripping mechanism 6 includes a base plate 33 mounted to the support bracket 31, a cylinder mechanism 34 supported by the base plate 33, and a bucket 35 moved up/down by the cylinder mechanism 34.

With brackets 33a, 33b secured to the upper and lower end portions of the base plate 33, the upper and lower end portions of the cylinder mechanism 34 are supported to be secured.

The cylinder mechanism 34 includes a cylinder body 34a, a piston 34b arranged in the cylinder body 34a in a freely slidable manner, and a piston rod 34c connected to the piston 34b. The bucket 35 is connected to the lower end portion of the piston rod 34c via a joint member 35a.

The cylinder mechanism 34 moves the bucket 35 up/down between a workpiece receiving position E1 (shown by a chain double-dashed line in FIG. 6) positioned slightly downward from the chuck 4a or 5a and a workpiece conveying position E2 (shown by a solid line in the same drawing) positioned above the main spindle.

In the frame member 8, the previously-described cableveyor 36 is arranged. The cableveyor 36 is that bundles a hydraulic hose 37 supplying hydraulic oil to the cylinder mechanism 34 and a flexible tube member such as an electric cable and so on that supplies electric power to various actuators.

One end portion 36a of the cableveyor 36 is secured to a support plate 38 mounted onto the secured plate 20 and, thereby, the one end portion 36a of the cableveyor 36 moves together with the secured plate 20 along with the rotation of the motor 13 of the workpiece moving mechanism 7. Meanwhile, the other end portion 36b of the cableveyor 36 is connected and secured to an external connecting port 36c formed in the bottom wall 8a of the frame member 8. The cableveyor 36 is thereby set to have a length corresponding to a moving stroke of the secured plate 20, and as a result to that of the workpiece gripping mechanism 6. Note that, although not shown in the drawing, the external connecting port 36c is connected to a hydraulic supply source or a power supply.

Here, that composing a part of the cableveyor 36, for example, the hydraulic hose 37 extends from the one end portion 36a to the secured plate 20 side to be connected to a hydraulic passage 22a formed in the connecting plate 22 via a joint 37a. The hydraulic passage 22a communicates with a hydraulic passage 21a formed in the support plate 21 and the hydraulic passage 21a communicates with a hydraulic chamber 34d of the cylinder body 34a via a joint 37b. Note that above-described joints 37 are positioned in an opening 31a formed in the support bracket 31 and the spacer member 32, and further, "37c" is an opening to pass an electric cable and the like therethrough.

In the apparatus according to the present embodiment, for example, when the machining at the first main spindle 4 side ends, in the workpiece gripping mechanism 6 standing by above the first main spindle 4, the cylinder mechanism 34 moves the bucket 35 down to the workpiece receiving position E1 being downward of the chuck 4a, the chuck 4a is then released, and the workpiece is dropped down to be accommodated in the bucket 35. The cylinder mechanism 34 then moves the bucket 35 up to the workpiece conveying position E2 being above the chuck. Sequentially, in the workpiece moving mechanism 7, the driving motor 13 thereof is activated and the belt 12 moves the workpiece gripping mechanism 6 in the axial direction of the frame member 8 via the support member 19. At this time, the support plate 21 is guided by the linear guide 23 and the guide rail 24 with the lower portion thereof, and it is guided by the cam followers 28, 28 and the guide plate 29 with the upper portion thereof, so that the support member 19 can move the workpiece gripping mechanism 6 surely.

When the workpiece gripping mechanism 6 is positioned at the workpiece carry-in-and-out position B, the cylinder mechanism 34 moves the bucket 35 down and transfers the workpiece onto a carry-out conveyor 40, and the workpiece is accommodated in a carry-out bucket (not shown) by the carry-out conveyor 40.

As has been described, in the present embodiment, the frame member 8 is composed of the pipe body extending from the workpiece machining position A to the workpiece carry-in-and-out position B, and the belt 12 is arranged in the accommodated state in the pipe body, where the frame member 8 serves as a cover of the workpiece moving mechanism 7 in addition to as a frame body supporting the workpiece moving mechanism 7, eliminating the need of a large-sized cover member, which is required when the workpiece moving mechanism is arranged outside the frame member, so that the entire machine can be made compact and the cost can be reduced.

Further, the workpiece moving mechanism 7 includes the support member 19 connected to the belt 12, and the support member 19 includes: the secured plate 20 arranged in the frame member 8; the support plate 21 arranged outside the frame member 8; and the connecting plate 22 connecting the support plate 21 and the secured plate 20 by passing through the slit groove 8b of the frame member 8, so that the structure to move the workpiece gripping mechanism 6 arranged outside the frame member 8 by the belt 12 arranged in the frame member 8 can be realized.

There is provided the sealing mechanism 30 sealing the space between the connecting plate 22 and the slit groove 8b, so that powdery cutting dust and the like can be prevented from entering into the frame member 8.

The sealing mechanism 30 is structured that the pair of leaf springs 30a, 30a sandwiches the connecting plate 22 therebetween and that they are mutually slidable, so that the space between the connecting plate 22 and the slit groove 8b can be sealed surely based on a simple structure.

In the frame member 8, the cableveyor 36 bundling the flexible tube members such as the hydraulic hose 37 supplying the hydraulic oil and the like to the workpiece gripping mechanism 6 and the electric cable supplying electric power to the workpiece grip mechanism 6 is arranged in the accommodated state therein, and the one end portion 36a of the cableveyor 36 is connected so as to move together with the workpiece gripping mechanism 6 and the other end portion 36b is connected and secured to the external connection port formed in the frame member 8, allowing the cableveyor 36 to be arranged using the internal space of the frame member 8, so that the hydraulic oil or the electric power can be supplied to the workpiece gripping mechanism 6 moving from the workpiece machining position A to the workpiece carry-in-and-out position B with no problem.

Further, the hydraulic passages 22a, 21a connecting the hydraulic hose 37 and the cylinder mechanism 34 are formed in the support member 19, so that the hydraulic passages can be prevented from having a complicated structure.

Note that, although the case where the workpiece moving mechanism 7 is of the belt type is presented in the above embodiments, that of a chain type is also applicable to the present invention.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A workpiece conveying apparatus of a machine tool, comprising:
    a workpiece gripping mechanism gripping a workpiece; a workpiece moving mechanism moving said workpiece gripping mechanism between a workpiece machining position and a workpiece carry-in-and-out position; and a frame member supporting said workpiece moving mechanism in a movable manner,
    wherein said frame member is composed of a pipe body extending at least to a vicinity of the workpiece carry-in-and-out position from the workpiece machining position,
    wherein said workpiece moving mechanism is structured to wind a belt member around a driving member and a driven member and to drive the driving member to rotate by a driving motor, and
    wherein the driving member, the driven member, and the driving motor are supported by said frame member,
    wherein the belt member is arranged in an accommodated state in said frame member; and
    wherein, in said frame member, a cableveyor formed by a flexible tube member and supplying working fluid or electric power to said workpiece gripping mechanism is arranged in an accommodated state therein, and
    wherein one end portion of the cableveyor is connected to said workpiece gripping mechanism to move together with said workpiece gripping mechanism and another end is connected to an external connection port formed in said frame member, and
    wherein said workpiece moving mechanism includes a support member connected to the belt member and inserted through a slit groove of said frame member, a linear guide is fixed to the support member, the linear guide is supported by a guide rail in a freely movable manner between the workpiece machining position and the workpiece carry-in-and-out position, the guide rail is fixed to an outer surface of a sidewall of said frame member via a base member, and said workpiece gripping mechanism is mounted onto the support member.

2. The workpiece conveying apparatus of the machine tool according to claim 1, wherein the support member includes a secured portion arranged in the frame member and secured at the belt member, a support plate arranged outside the frame member and supporting the workpiece gripping mechanism, and a connecting portion arranged to be inserted into a slit groove formed in the frame member and connecting the support plate and the secured portion.

3. The workpiece conveying apparatus of the machine tool according to claim 2,
    further comprising a sealing mechanism sealing a space between the connecting portion and the slit groove, wherein said sealing mechanism is mounted onto said frame member and composed of a pair of leaf springs arranged to sandwich the connecting portion in a mutually slidable manner.

* * * * *